US008359755B1

(12) United States Patent
Laube

(10) Patent No.: US 8,359,755 B1
(45) Date of Patent: Jan. 29, 2013

(54) ANIMAL HAIR GROOMING TOOL

(75) Inventor: Kim E. Laube, Thousand Oaks, CA (US)

(73) Assignee: WORX4U2, Inc., Oxnard, CA (US)

( * ) Notice: Subject to any disclaimer, the term of this patent is extended or adjusted under 35 U.S.C. 154(b) by 0 days.

(21) Appl. No.: 11/341,792

(22) Filed: Jan. 26, 2006

(51) Int. Cl.
*A01K 13/00* (2006.01)
*B26B 27/00* (2006.01)

(52) U.S. Cl. ............... 30/199; 30/194; 30/330; 30/340; 119/611; 119/625

(58) Field of Classification Search ............ 30/153, 30/155, 136, 330, 57, 34.1, 158–162, 30, 30/50, 194, 304, 224, 491, 123.3, 233.5, 30/349, 230, 346.56, 355, 200–201, 58, 156, 30/195, 196, 199, 211, 235, 250, 261, 341, 30/47, 526, 527, 528, 122, 132, 517, 177, 30/186; 15/236.02, 110, 185, 203, 402, 111, 15/144.1; 607/79; 119/600–602, 625, 630–632, 119/610–619, 628, 664; 132/131–135, 119, 132/148, 219, 150, 271; 403/122, 124, 129, 403/92, 96, 97; D28/48, 25, 52; D04/118; 16/436, 438, 900; 81/177.6–177.9, 57.26
See application file for complete search history.

(56) References Cited

U.S. PATENT DOCUMENTS

| | | | | |
|---|---|---|---|---|
| 1,241,969 A * | 10/1917 | Hartman | | 30/286 |
| 1,469,957 A * | 10/1923 | Rich | | 172/372 |
| 2,587,964 A * | 3/1952 | Burns | | 30/30 |
| 2,615,243 A * | 10/1952 | Brown | | 30/30 |
| 3,106,020 A * | 10/1963 | Tape | | 30/346.61 |
| 3,491,725 A * | 1/1970 | Maniscalco | | 119/625 |
| 3,897,629 A * | 8/1975 | Liedtke | | 30/30 |
| 4,542,554 A * | 9/1985 | Wallerstein | | 15/236.02 |
| 4,581,822 A * | 4/1986 | Fujimura | | 30/216 |
| 4,685,279 A * | 8/1987 | Gullett | | 56/12.7 |
| 4,765,060 A * | 8/1988 | Veselaski et al. | | 30/208 |
| 4,779,301 A * | 10/1988 | Millette | | 15/105 |
| 4,936,014 A * | 6/1990 | Shaanan et al. | | 30/162 |
| D312,144 S * | 11/1990 | Buba | | D28/52 |
| 4,970,990 A * | 11/1990 | Wilhelmi | | 119/601 |
| 5,208,984 A * | 5/1993 | Negus | | 30/169 |
| D358,909 S * | 5/1995 | Rawski | | D30/159 |
| 5,606,799 A * | 3/1997 | Melton | | 30/216 |
| 5,643,403 A * | 7/1997 | Poole et al. | | 156/584 |
| 5,867,911 A * | 2/1999 | Yates et al. | | 30/276 |
| D448,116 S * | 9/2001 | Granito | | D28/25 |
| 6,446,340 B1* | 9/2002 | Ping | | 30/125 |
| 6,536,116 B2* | 3/2003 | Fung | | 30/199 |
| 6,782,846 B1 | 8/2004 | Porter | | |
| 6,807,738 B1* | 10/2004 | Shih et al. | | 30/321 |
| 6,865,816 B1* | 3/2005 | Zajdel | | 30/330 |

(Continued)

OTHER PUBLICATIONS

Exhibits for Kim E. Laube Declaration to be filed on Aug. 14, 2009, for Litigation in the U.S. District Court, Eastern District of Missouri, Eastern Division.

*Primary Examiner* — Laura M. Lee

(74) *Attorney, Agent, or Firm* — Dennis W. Beech

(57) ABSTRACT

The present invention may be used for removal of hair or fur from an animal. A blade holder may be rotatetably attached to a handle. The blade holder may have a body that may have a cavity that may be shaped to receive a cutting blade. A blade clamp may be disposable on a cutting blade and a fastener may be attached to attach the blade clamp and the cutting blade on the body.

10 Claims, 3 Drawing Sheets

U.S. PATENT DOCUMENTS

| | | | |
|---|---|---|---|
| 6,886,255 B2 * | 5/2005 | Freas et al. | 30/43.91 |
| 6,955,137 B2 | 10/2005 | Dunn et al. | |
| 6,968,622 B2 * | 11/2005 | Ping | 30/156 |
| 7,077,076 B2 | 7/2006 | Porter | |
| 7,222,588 B2 | 5/2007 | Porter | |
| 7,334,540 B2 | 2/2008 | Porter | |
| D565,258 S * | 3/2008 | Porter et al. | D30/158 |
| 7,509,926 B2 | 3/2009 | Porter | |
| 2002/0078518 A1 * | 6/2002 | Jiang | 15/111 |
| 2004/0177461 A1 * | 9/2004 | Ajluni | 15/121 |
| 2004/0194728 A1 * | 10/2004 | Dunn et al. | 119/625 |
| 2005/0055834 A1 * | 3/2005 | Cheah et al. | 30/210 |
| 2005/0081875 A1 * | 4/2005 | Wang | 132/219 |
| 2005/0229398 A1 * | 10/2005 | Leventhal | 30/34.1 |
| 2006/0021175 A1 * | 2/2006 | Peroni | 15/236.02 |
| 2006/0037556 A1 | 2/2006 | Porter | |
| 2007/0084416 A1 * | 4/2007 | Liao | 119/625 |
| 2008/0029044 A1 * | 2/2008 | Porter et al. | 119/631 |
| 2008/0078333 A1 * | 4/2008 | Wang | 119/611 |
| 2009/0101076 A1 * | 4/2009 | Khubani et al. | 119/611 |
| 2009/0126648 A1 * | 5/2009 | Porter et al. | 119/601 |
| 2009/0126649 A1 * | 5/2009 | Porter et al. | 119/601 |

* cited by examiner

ANIMAL HAIR GROOMING TOOL

BACKGROUND OF THE INVENTION

This invention relates to devices for use in grooming and removal of loose hair or fur. The new hair grooming tool may be useful in grooming animals that may have a double hair coat, such as, certain breeds of dogs; however, the device may be useful for other hair grooming and removal applications. The new device may have a handle and a blade holder that may be attached by a rotatable element that may allow angular positioning of the blade holder relative to the handle.

Various hair grooming tools may be known for use in grooming animals. A common tool is a stiff comb that may be constructed of metal or other suitable material. A comb may be drawn or pushed through an animals hair or fur to remove loose hair and fur. Another common tool is a wire brush that may be drawn or pushed through an animals hair or fur to catch loose hair and fur. Other grooming tools that may have a handle perpendicular to a comb or blade with comb teeth may also be known. These tools or devices may be restricted in use to being pulled through an animals hair and may have no provision for other orientations of a blade or comb relative to a handle.

SUMMARY OF THE INVENTION

The present invention is directed to devices for removal of hair or fur from an animal. A blade holder may be rotatetably attached to a handle. The blade holder may have a body that may have a cavity that may be shaped to receive a cutting blade. A blade clamp may be disposable on a cutting blade and a fastener may be attached to attach the blade clamp and the cutting blade on the body.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
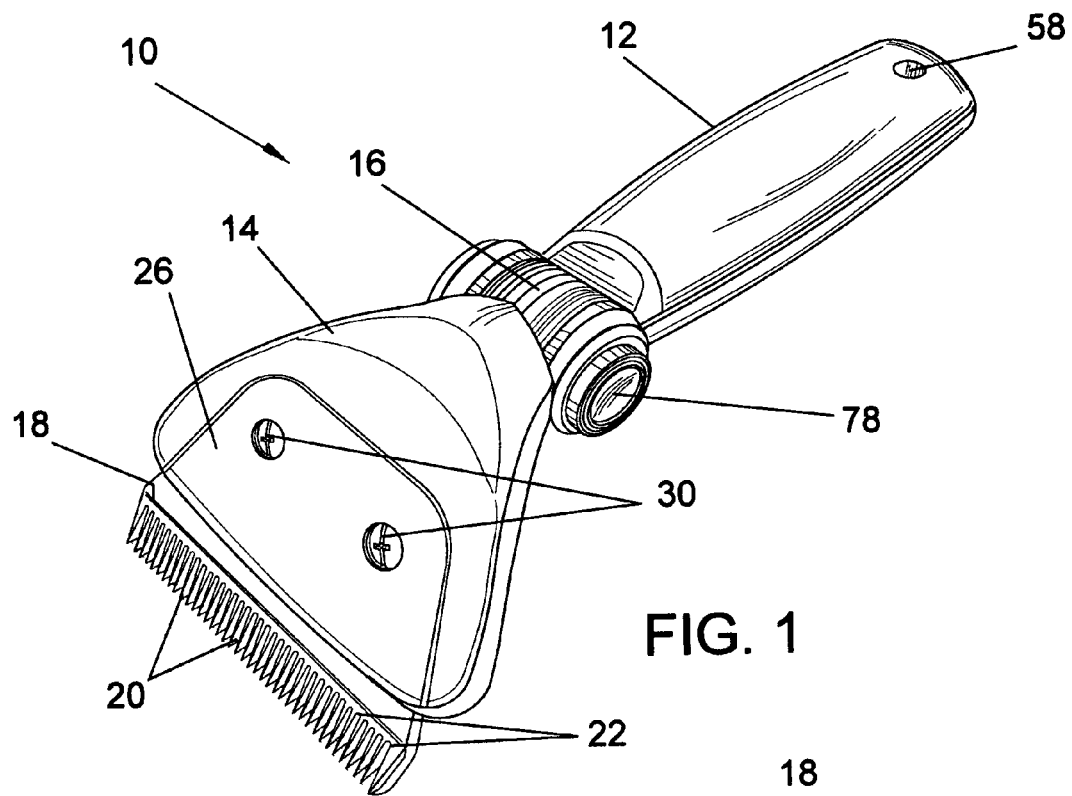
FIG. 1 illustrates a perspective view of the hair grooming tool according to an embodiment of the invention.
Figure 2:
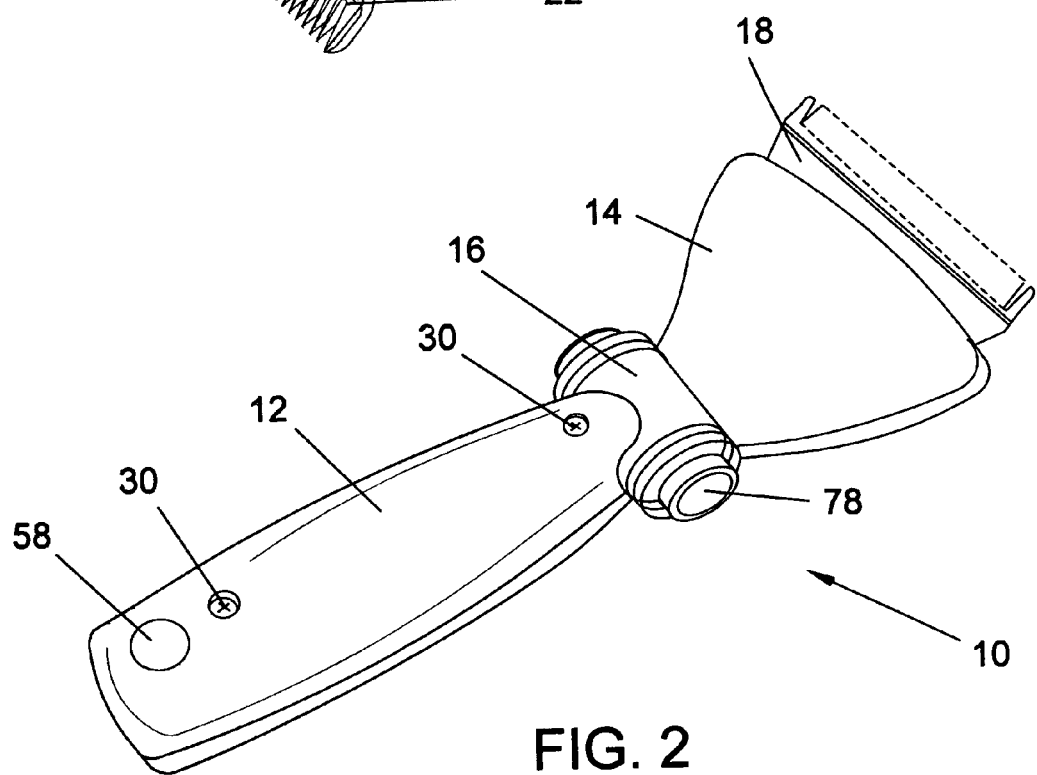
FIG. 2 illustrates a perspective view of the hair grooming tool according to an embodiment of the invention.
Figure 3:
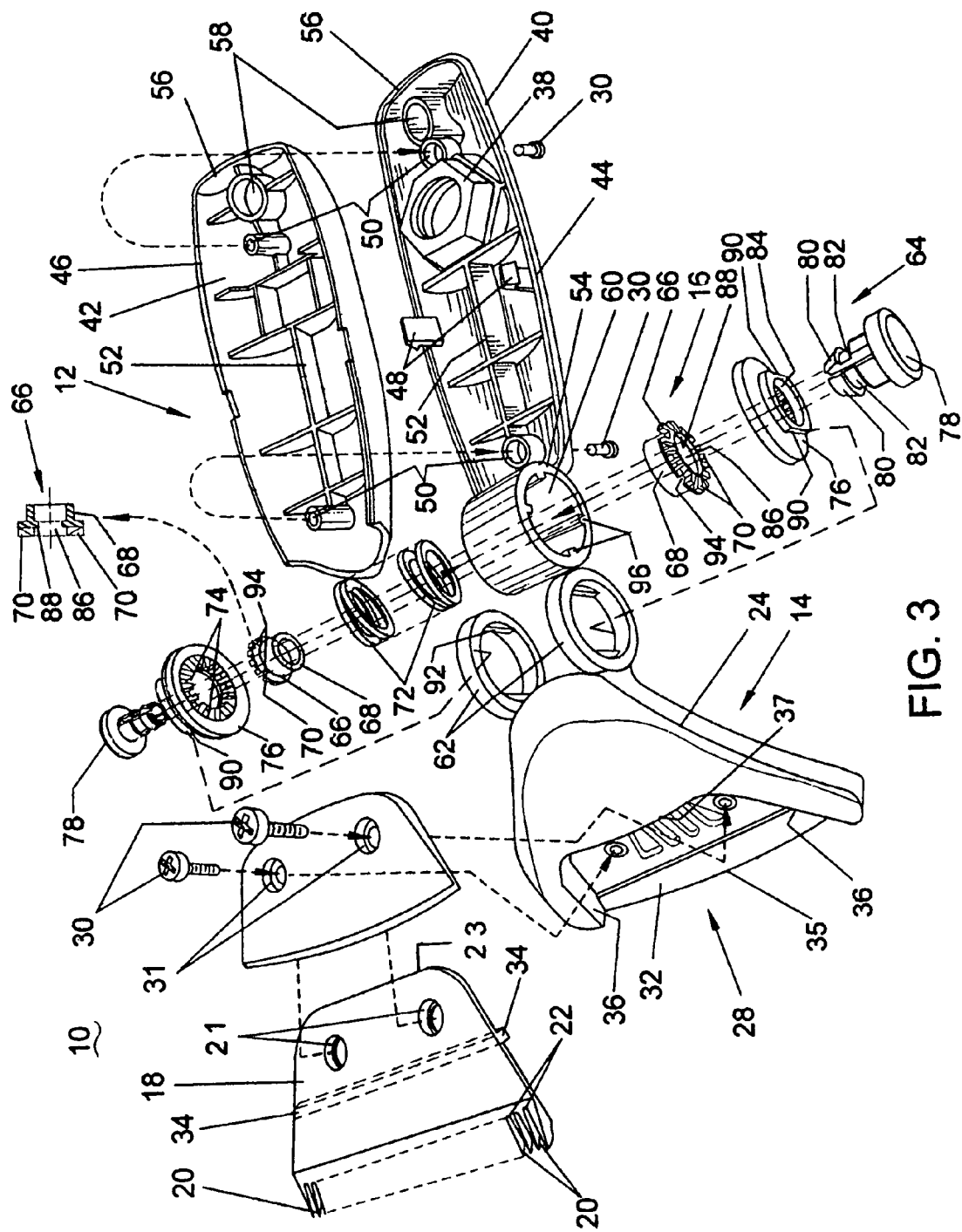
FIG. 3 illustrates a perspective exploded view of the hair grooming tool according to an embodiment of the invention.

Referring to FIGS. 1 through 3, an animal hair grooming tool 10 may have a handle 12 and a blade holder 14 attached by a rotatable element 16. The blade holder 14 may allow attachment of standard, wide or other size snap on blades 18 that may also be used with hair clippers. The snap on blades 18 may have comb teeth 20 that may have cutting edge 22 surfaces between the comb teeth 20. The blade holder 14 may have a body 24 and blade clamp 26 wherein a blade 12 may be positioned in a cavity 28 of the body 24 and retained by the blade clamp 26 and by screws 30. The screws 30 may be inserted through blade apertures 21 and clamp apertures 31 to then be threadably engaged in threaded bores in the body 24.

The handle 12 may have two elements 40, 42 that may have mating edges 44, 46. The mating elements 40, 42 may be disposed together and retained by clip elements 48 and screws 30 threaded into threaded attachment elements 50. The handle elements 40, 42 may generally be hollow and have structural ribs formed interior in the hollow portion for strengthening elements.

A rotatable element 16 may have a sleeve 60 that may be attached at an end 54 of a handle element 40 positioned to mate with two spaced apart rings 62 that may be attached to the body 24 opposite the cavity 28. The sleeve 60 and the rings 62 may be rotatably attached by a latching apparatus 64. The latching apparatus 64 may have two shaft elements 66 having a hollow rod 68 with an annular flange 69 that may have radial teeth 70. A spring 72 may be disposed on each hollow rod 68 when the shaft elements 66 may be inserted, opposed one to the other, in the sleeve 60. The spring 72 may bias annular flanges 69 outwardly to engage radial slots 74 in latching caps 76 disposed in rings 62.

There may be push elements 78 that may have elastic tabs 80 with annular grooves 82. The elastic tabs 80 may be inserted through an aperture 84 in latching caps 76 to be forced partially through attachment apertures 86 disposed in shaft elements 66. The attachment apertures 86 may have interior flanges 88 to engage the annular grooves 82.

When assembled the latching caps 76 may be held rigid relative to rings 62 by flat portion 90 engagement with ridges 92. The shaft elements 66 may be restrained from rotating in sleeve 60 by slots 94 engaging keys 96. When both push elements 78 may be forced inwardly the shaft elements 66 may be disengaged from the latching caps 76 to allow the blade holder 14 to rotate relative to the handle 12.

Figure 4:
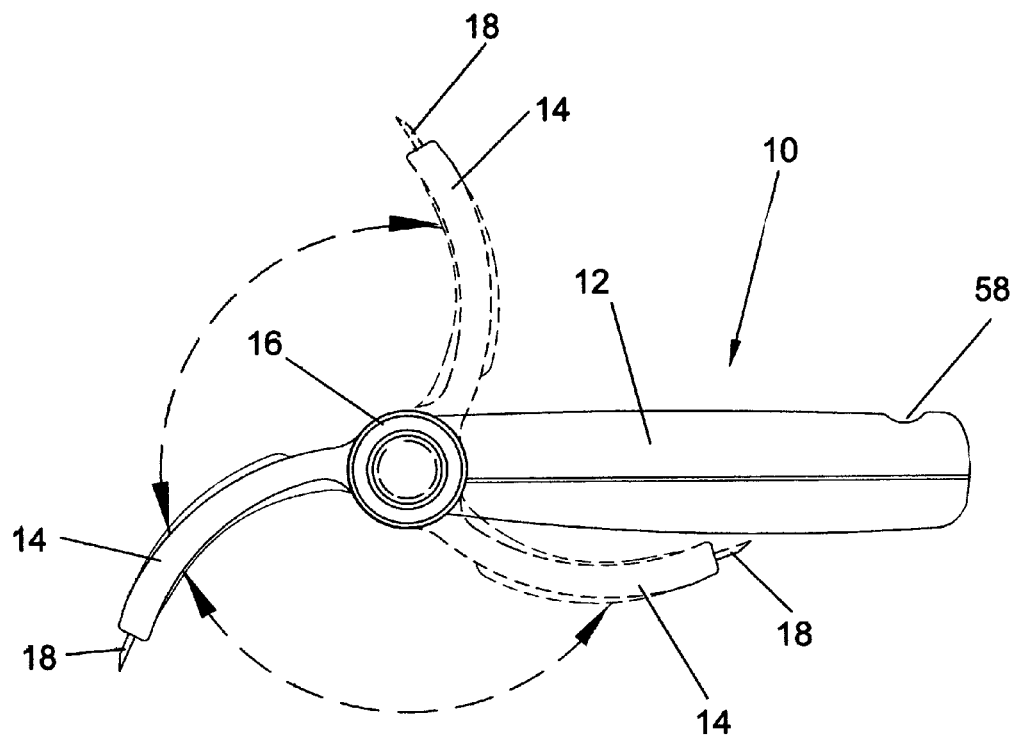
FIG. 4 illustrates a side view of the tool with angular positioning of the blade holder according to an embodiment of the invention.
Figure 5:
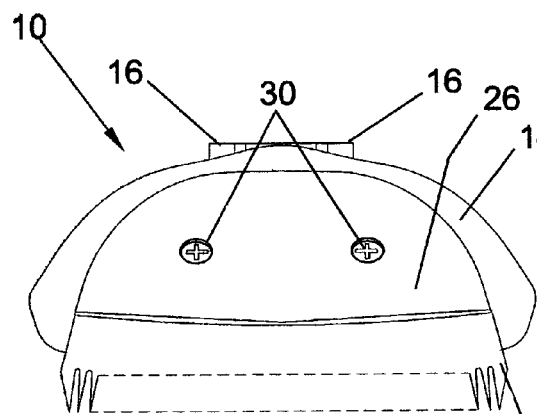
FIG. 5 Illustrates a blade holder end view of the tool according to an embodiment of the invention.
Figure 6:
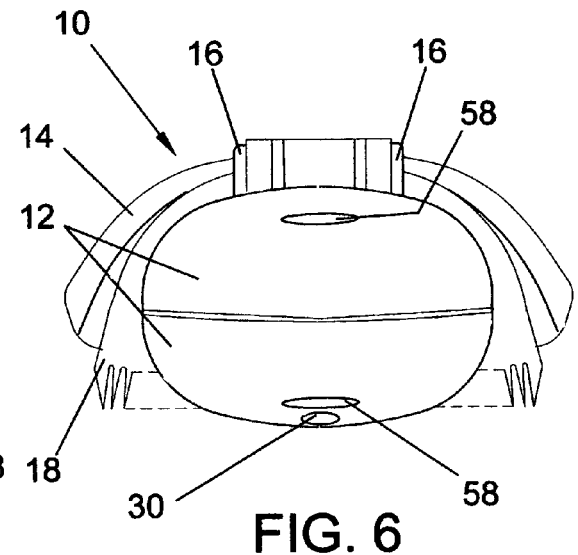
FIG. 6 illustrates a handle end view of the tool according to an embodiment of the invention.

Referring to FIGS. 3 through 6, the latching apparatus 64 may allow the blade holder 14 to be rotated to various angular positions relative to the handle 12 as may be illustrated in FIG. 4. The hair grooming tool 10 may be pushed through the hair of an animal to groom and remove loose hair or fur. This may be particularly useful for double hair coat breeds of animals.

There may be a handle aperture 58 adjacent the end 56 opposite the end 54. A line, strap or the like may be looped through the handle aperture 58 as an aid in retaining the tool 10 while grooming an animal. A balance weight 38 may be disposed in the handle 12 to aid in use of the tool 10. The handle 12 may be wider in the mid portion relative to the ends 54, 56 to aid in gripping the handle 12. The cavity 28 in the blade holder 14 may have an elevated portion 32 or ridge adjacent a forward edge 35. The cavity 28 may also have opposed side walls 36 and a back wall 37. The blade 18 may have a raised portion 34 that may abut the elevated portion 32 when the blade 18 is disposed in the cavity 28. The opposed side walls 36, back wall 37, and elevated portion 32 of the cavity 28 that may fit together with a raised portion 34 of a blade 18 wherein the raised portion 34 abutting the elevated portion 32 may aid in retaining the blade 18 to inhibit movement of the blade 18 when the grooming tool may be in use.

While the invention has been particularly shown and described with respect to the illustrated embodiments thereof, it will be understood by those skilled in the art that the foregoing and other changes in form and details may be made therein without departing from the spirit and scope of the invention.

I claim:
1. A device for removal of hair and fur from an animal comprising:
   a blade holder and a handle are rotatably attached by a rotatable element comprising:
   a sleeve attached to a rotational end of said handle;
   a pair of rings attached to said body;
   a latching apparatus disposed in said sleeve and said pair of rings;
   wherein said latching apparatus comprising:
   two opposed shaft elements each having a hollow rod with an annular flange having a plurality of radial teeth;
   said two opposed shaft elements slidably inserted in said sleeve with the ends of a spring disposed on each of said hollow rods and said two opposed shaft elements restricted from rotating;
   said spring acting to force said annular flanges outwardly to engage each of said annular flanges said plurality of radial teeth with a latching cap having a plurality of radial slots;
   said latching caps disposed in said rings and restricted from rotating in said rings; and
   a push element having a plurality of elastic tabs having annular grooves is inserted through each of said latching caps having an aperture therein and said elastic tabs inserted into said hollow rod to engage said annular grooves in an interior flange of said shaft element;
   said blade holder has a body with a cavity therein and said cavity has side walls, a back wall, and an upstanding projecting ridge adjacent and parallel to a forward edge;
   a cutting blade that has a plurality of comb teeth with a cutting edge formed on each of said comb teeth intermediate adjacent comb teeth and has a raised portion disposed to abut said upstanding projecting ridge when said blade is disposed in said cavity;
   a blade clamp disposable on said cutting blade in said cavity and a fastener attached to said blade clamp and said cutting blade on said body.

2. The device as in claim 1 wherein said handle comprising:
   a first handle element having a first mating edge and a second handle element having a second mating edge; and
   said first handle element and said second handle element disposed together along said first mating edge and said second mating edge, and attached by a first handle fastener and a second handle fastener.

3. The device as in claim 2 wherein said first handle fastener is a clip element and said second handle fastener is a screw threadably inserted in a threaded attachment element.

4. The device as in claim 2 wherein said first handle element and said second handle element have a generally hollow interior and a plurality of ribs disposed in said generally hollow interior.

5. The device as in claim 1 wherein said sleeve has a key for engagement with said two opposed shaft elements having a slot therein and said latching caps having a flat portion for engagement with said rings having an interior ridge.

6. The device as in claim 1 wherein said hollow rods have a cylindrical cross section shape.

7. The device as in claim 1 wherein;
   said cutting blade having a blade aperture intermediate said raised portion and a rear edge;
   said blade clamp having a clamp aperture disposed to align with said blade aperture; and
   said fastener is a screw inserted through said blade aperture and said clamp aperture, and threadably engaged with said blade holder.

8. The device as in claim 1 wherein said handle has an aperture end having a handle aperture therein.

9. The device as in claim 1 wherein said handle is wider intermediate a rotation end and an aperture end.

10. The device as in claim 1 wherein said handle having a balance weight disposed therein.

\* \* \* \* \*